UNITED STATES PATENT OFFICE.

JOHN D. BRAMAN, OF GALVESTON, TEXAS, ASSIGNOR OF ONE-HALF HIS RIGHT TO ANTONIO ROBIRA, OF SAME PLACE.

IMPROVEMENT IN INSECT-DESTROYING COMPOUNDS.

Specification forming part of Letters Patent No. 151,078, dated May 19, 1874; application filed March 2, 1874.

*To all whom it may concern:*

Be it known that I, JOHN D. BRAMAN, of Galveston, in the county of Galveston and State of Texas, have invented a new and useful Compound for Destroying Cotton-Worms; and I do hereby declare that the following is a full, clear, and exact description thereof.

The nature of my invention consists in a mixture of the arseniate of soda and water, or arseniate of soda, dextrine, and water, prepared in certain proportions of the respective ingredients, for the purpose of destroying cotton-worms.

To make one gallon of my compound, I take of arseniate of soda fifty grains, water (cold) one gallon, and dextrine two hundred grains. These are placed together in a vessel, and allowed to remain until the arseniate of soda and the dextrine are dissolved, or an intimate union of the whole is effected.

The arseniate of soda is readily dissolved by the water, and, on this account, its use is adopted in preference to any other salt of arsenic. This ingredient is used on account of its poisoning properties.

The dextrine is a vehicle for the poisonous ingredient, and its use improves the compound by rendering the poison less liable to be washed off from the cotton-plant by rain; and, while this is the case, there is less liability of the poison being absorbed by the plants.

The water is used to dilute the poison and dissolve the other ingredient.

Arseniate of soda as an ingredient is new in compounds of this character, and the proportions in which I employ it, with water or with water and dextrine, are such that, while the worm will be poisoned by it, the plant will not be destroyed or injured.

My reasons for using the arseniate of soda in preference to any other salt of arsenic are, first, it is readily soluble in cold water, while arsenious acid requires long boiling to procure a perfect solution. Second, from actual experiments I have found the arseniate of soda to prove successful in destroying the cotton-worm after the paris-green and arsenious acid had both failed. This I attribute to the fact that, with the arseniate of soda, a more perfect solution was procured, and that the poison was equally distributed over the plant, so that, if the worm ate any portion of the plant, it was certain to get some of the poison. Third, when the arseniate of soda is used the plant remains uninjured, while the paris-green, in many instances, causes the bolls and "forms" of the plant to shed. Fourth, the cost of the arseniate of soda, as compared with the compound of paris-green, flour, &c., is trifling.

It is important in a compound of this character to have the proportions precise, in order to destroy the worm without injury to the plants, and which is one material point that those who have preceded me in the effort to destroy the cotton-worm with poisons have overlooked; and, hence, while the remedy was effective for the purpose intended, it also destroyed that which it was designed to save.

What I claim as new, and desire to secure by Letters Patent, is—

A mixture for destroying cotton-worms, consisting of arseniate of soda and water, or arseniate of soda, dextrine, and water, mixed in the proportions and in the manner herein described.

JOHN DENISON BRAMAN.

Witnesses:
WM. R. JOHNSON,
C. W. PRESTON.